April 29, 1969 P. DOSCH ET AL 3,441,738
SLUB-CATCHER FOR THREADS WITH ESSENTIALLY ONE-DIMENSIONAL
LIGHT SOURCE AND SENSOR LOCATED IN PLANE
PERPENDICULAR TO THREAD
Filed July 13, 1966
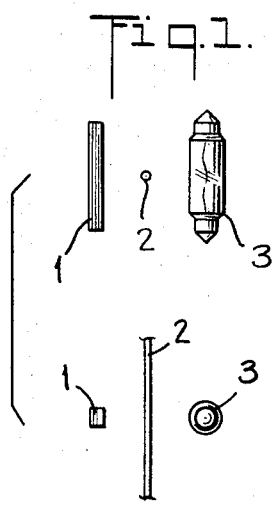
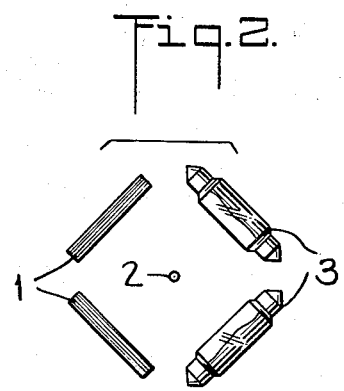
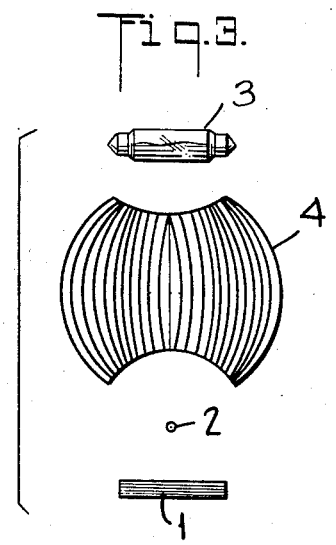
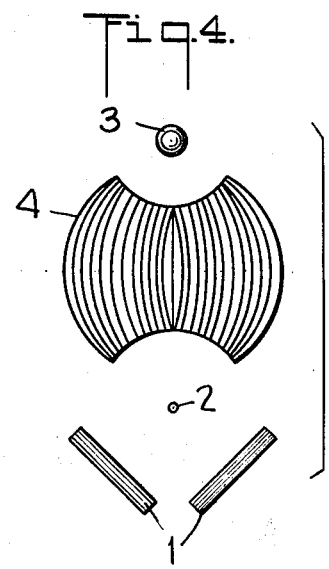
INVENTORS
PETER DOSCH
KARL GALIA
BY
ATTORNEYS United States Patent Office 3,441,738
Patented Apr. 29, 1969

3,441,738
SLUB-CATCHER FOR THREADS WITH ESSENTIALLY ONE-DIMENSIONAL LIGHT SOURCE AND SENSOR LOCATED IN PLANE PERPENDICULAR TO THREAD
Peter Dosch, im Rank, Jona, and Karl Galia, Wattwil, Switzerland, assignors to Heberlein & Co. AG, Wattwil, Switzerland, a corporation of Switzerland
Filed July 13, 1966, Ser. No. 564,922
Claims priority, application Germany, July 24, 1965, H 56,684
Int. Cl. G01n 21/30
U.S. Cl. 250—219                                  7 Claims This invention relates to slub-catchers or apparatus for sensing certain defects such as variations in the cross-section of linearly advancing threads and the like, and more particularly, to an electro-optical arrangement for accurately sensing such defects.

In slub-catchers generally, the thread to be investigated is advanced longitudinally between a light source and a light receiver so that when a defect such as a slub, which effectively varies the cross-section of the thread, passes between the light source and the receiver, the amount of light reaching the receiver is varied. The receiver is usually a photocell and constitutes a part of an electrical system which detects variations in the light striking the receiver and reacts to identify the location of the slub or to effect the operation of apparatus for eliminating it.

Slub-catchers of the class described have three basic requirements: (1) the quantity of light striking the receiver must not vary when the thread being investigated moves perpendicularly to its running axis, i.e., it is necessary that no signal variations be created when the thread oscillates or flutters as may be caused by roughness of certain threads running over the thread guides at high speeds, for example; (2) a defect or slub in the thread which does not present a circular cross-section, but rather, for example, an oval cross-section perpendicular to its running axis should, if possible, always induce the same light variation in the receiver, regardless of the angular position in which it passes through the area of investigation between the light source and the light receiver; and (3) in order for a slub-catcher to be truly effective, its measuring zone must have a very small dimension in the direction of the longitudinal axis of the thread with respect to the usual length of the defects if beside the thickness of the defect also the length of the defect is recognized.

Various electro-optical arrangements for slub-catchers are already known to the art; but as far as we are aware, none of them is capable of complying with all of the foregoing requirements. Thus, in slub-catchers which utilize a bundle of parallel or approximately parallel light rays, the second requirement above cannot be met. Two or more cross light ray bundles each having parallel light rays, as described in U.S. Patent No. 3,053,986, can only comply with the first requirement, if the bundles are relatively broad and this implies greater technical expenditures. Additionally, this approach to the problem has a further disadvantage in that shadow stripes occur in the light ray bundles when local dirt deposits are formed on the equipment, and this causes signals which are interpreted as defects when the thread oscillates or flutters.

It is also known to provide an arrangement whereby the light rays are diffused, and this is more favorable with respect to compliance with the first and second requirements. These light sources or emitters may easily be made to have such contoured surfaces that they readily comply with the first requirement; and very numerous light ray directions exist in such apparatus so that the second requirement is also more or less complied with. To meet the third requirement, however, an emitter of diffused light rays is not suitable since the principle of scattering the light rays in all directions is opposed to the requirement of concentration of the light rays in a small measuring zone; and if a mask were provided leaving open only a small measuring zone, the emitter or source of diffused light rays would be able only to emit a sufficient light intensity to obtain only a very low effectiveness, so that an increased technical expenditure would be required.

We have conceived an electro-optical arrangement for a slub-catcher which effectively overcomes the foregoing difficulties and disadvantages, and permits compliance with each of the three requirements mentioned heretofore.

Basically, we contribute apparatus of the class described for sensing variations in the cross-section of relatively linearly advancing threads comprising light transmitter means and light receiver means arranged so that the thread advances therebetween, the transmitter and receiver means each approximating linear configurations and having their longitudinal axes in a plane perpendicular to the axis of the advancing thread. The most favorable arrangement, of course, would involve a transmitter and receiver each resembling as far as possible a line, and each lying in the same plane. Since it is technically impossible to achieve such narrow elements, it is our stated purpose to approximate as closely as possible such optimum configuration within the limits of the limits of the technology. Thus, we have employed elongate tubular lamps for the light source and, in one embodiment of the invention, we utilize light conductors positioned between the light source and the thread, the conductors receiving light from the source and directing it towards the receiver means in the form of a narrow band of light through which the thread is made to advance. It will be appreciated that where light conductors of this type are employed it is possible to utilize a point source of light, or again the closest approximation thereof which may be achieved within the limits of the technology.

We also contemplate the provision as light transmitter means of a plurality of elements disposed angularly relatively to one another, such as a pair of tubular lamps disposed at angles to one another but each in a plane perpendicular to the longitudinal axis of the threads. The receiver means may also comprise a plurality of elements disposed angularly relatively to one another in the same manner, or both the transmitter and receiver means may be so constructed and arranged.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as to not depart from the spirit and scope of the invention.

A specific embodiment of the invention has been chosen for purposes of illustration and description, and is shown in the accompanying drawings, forming a part of the specification, wherein:

FIG. 1 is a schematic composite plan and elevational view of an arrangement according to the present invention;

FIG. 2 is an elevational view of a modification of the apparatus of FIG. 1;

FIG. 3 is an elevational view of a further modification of the invention; and

FIG. 4 is still a further modification of the invention.

Referring now to the drawings, and more particularly to FIG. 1 thereof, there is shown an arrangement according to the invention wherein a thread 2 of indefinite continuous length is shown advancing longitudinally between a thin light receiver 1 and a light source 3 which approximates line or linear configuration, and which is here illustrated as an elongate tubular lamp. Generally, any type of lamp which has a filament extending in longitudinal direction will comply with the requirements of the present invention.

According to the arrangement illustrated in FIG. 1, it will be seen that the light rays have different path lengths in traveling between the source and the receiver so that, depending on their angular position, flat defects will create somewhat different signals. Thus, as shown in FIG. 2, the narrow light receiver has been divided into two light receivers 1 disposed angularly relatively to one another; and also the linear light source 3 has been divided into two linear light sources disposed angularly relatively to one another, with the thread advancing longitudinally between thte source and the receiver. This arrangement has proven to be very suitable, especially in respect of the identification of relatively flat defects. It will be appreciated that the modification of FIG. 2 may be further developed by utilizing light sources and receivers which consist of more than two parts each and which are positioned angularly relatively to one another in the same plane.

An optimum arrangement would utilize a narrow circular light receiver and a circular light source. However, this modification cannot be realized in practice without the introduction of technical difficulties. It has been established however, that very good results can be obtained if so-called light conductors are used to establish a linear light source. These conductors have the ideal property of receiving light rays and so arranging them as to permit them to leave as rays advancing in the same plane. Thereby the rays of each light element advance at angles to each other and to the rays of the other light elements. Light conductors further introduce the advantage that any form of linear light source may be utilized according to its best adaptation to the particular light emitter, and at the same time only very negligible light losses result from their use.

The principle of an arrangement utilizing light conductors is best illustrated in FIGS. 3 and 4 wherein a flat bundle of light conductors 4 are positioned between the lamp 3 and the advancing thread 2. These light conductors may consist of bars of Plexiglas (methyl polymethacrylate) with circular or rectangular cross-sections. The light conductors may be deliberately constructed so that, depending on the shape of the light emitter and the light receiver, the foregoing conditions 1 and 2 may be fulfilled in the best possible manner.

FIG. 4 illustrates the use of a point light source 5 in lieu of the tubular arrangement shown in FIG. 3. In both modifications however, it will be appreciated that the light conductors will provide that the light transmitted through the receiver will appear to be nearly linear when viewed from the receiver; and it will be appreciated too that the receiver 1 illustrated in FIG. 4 may be a single element receiver as shown in FIG. 3, or may comprise a number of elements greater than two as mentioned heretofore.

By way of example, we have found light receivers measuring 2 mm. in width and 10 mm. in length to be quite satisfactory. It will be appreciated, of course, that the longer the receiver is the greater the thread fluctuations which can be tolerated without a false signal.

From the foregoing description, it will be seen that we contribute by our invention a novel electro-optical arrangement for slub-catchers which overcomes the difficulties and disadvantages associated with known devices of the class described and meets all of the essential requirements of effective slub-catchers. By the term "thread" it will be understood that we include all thin elongate filament-like articles such as textile threads and yarns, and the like.

We believe that the construction and operation of our novel invention will now be understood, and that the advantages thereof will be fully appreciated by those persons skilled in the art.

We claim:

1. Apparatus of the class described for sensing variations in cross-section of relatively linearly advancing threads comprising light transmitter means and light receiver means arranged so that the thread advances therebetween, said transmitter and receiver means each approximating linear configurations and having their longitudinal axes in a plane perpendicular to the axis of the advancing thread.

2. Apparatus according to claim 1, wherein said light transmitter means is an elongate tubular lamp.

3. Apparatus according to claim 1, wherein said light transmitter means is a plurality of elements disposed angularly relatively to one another.

4. Apparatus according to claim 1, wherein said receiver means is a plurality of elements disposed angularly relatively to one another.

5. Apparatus according to claim 1, wherein said transmitter means include a group of light conductors positioned between a light source and the thread, said conductors being arranged to receive the light from said source and transmit a narrow band of light to said receiver means.

6. Apparatus according to claim 5, wherein said light source approximates a point source.

7. Apparatus of the class described for sensing variations in cross-section of relatively linearly advancing threads comprising light transmitter means and light receiver means arranged so that the thread advances therebetween, said transmitter and receiver means each consisting of a plurality of angularly related elements approximating linear configurations and having their longitudinal axes in a plane perpendicular to the axis of the advancing thread.

References Cited

UNITED STATES PATENTS

| | | |
|---|---|---|
| 2,895,373 | 7/1959 | Eyrand. |
| 2,991,685 | 7/1961 | Van Dongeren. |
| 3,053,986 | 9/1962 | Loepfe et al. |
| 3,240,106 | 3/1966 | Hicks _____ 250—227 X |
| 3,248,554 | 4/1966 | Chew _____ 250—227 |
| 3,264,922 | 8/1966 | Peyer. |

RALPH G. NILSON, *Primary Examiner.*

M. A. LEAVITT, *Assistant Examiner.*

U.S. Cl. X.R.

250—227; 88—14